Aug. 26, 1958 J. A. DRAIN ET AL 2,849,139
MINE SHAFT MUCKING MACHINE
Filed June 10, 1955 2 Sheets-Sheet 1
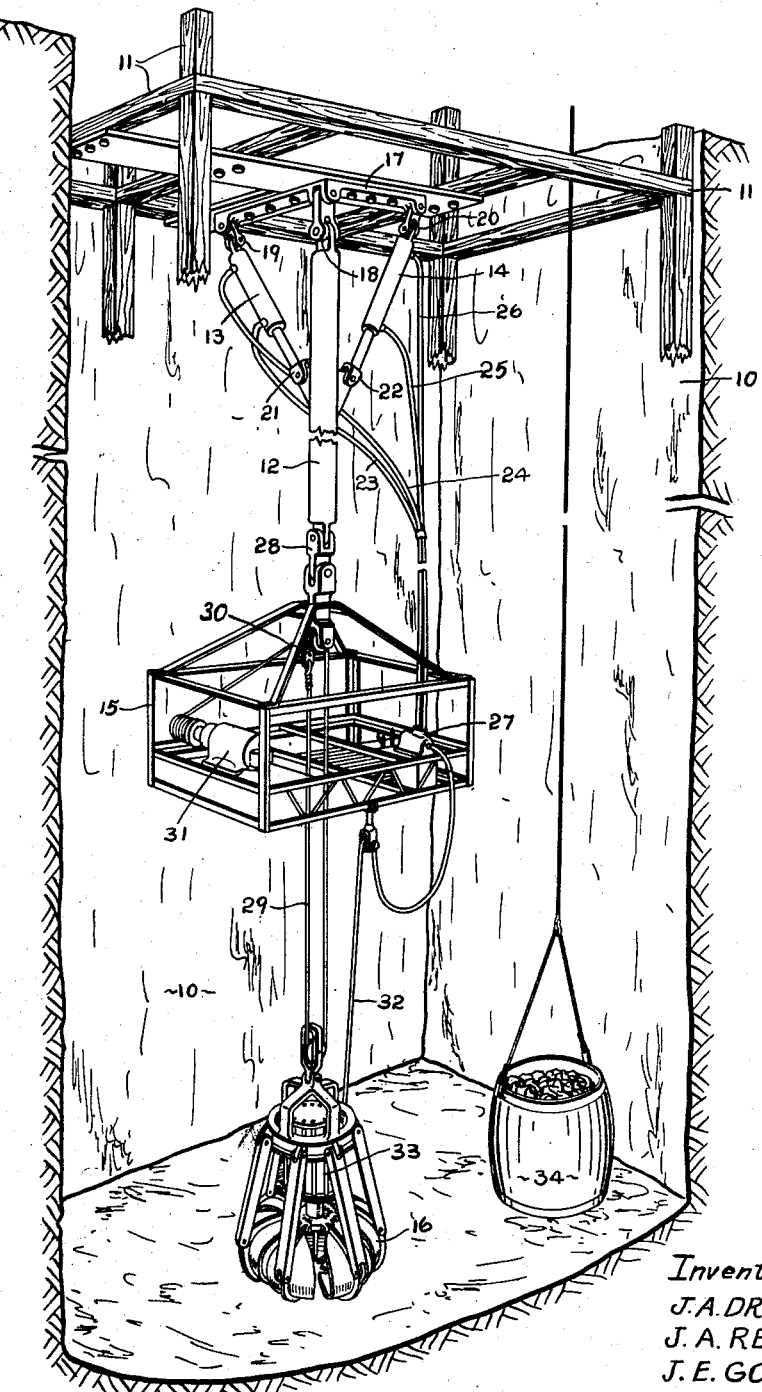
FIG I.
Inventors,
J. A. DRAIN,
J. A. READ,
J. E. GORDON
BY
Charles F. Osgood
ATTORNEY.

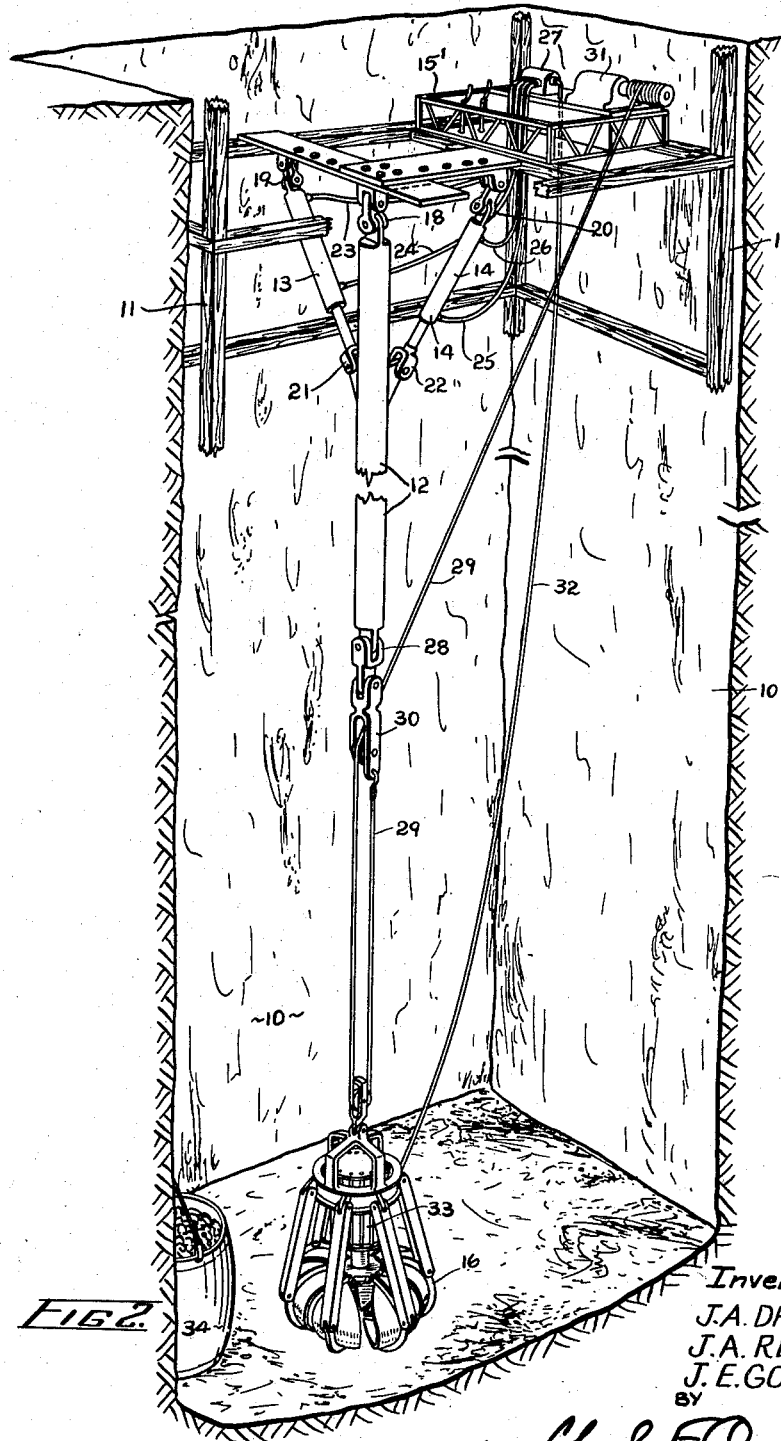

United States Patent Office 2,849,139
Patented Aug. 26, 1958

2,849,139
MINE SHAFT MUCKING MACHINE

James A. Drain, Blair, Ontario, John Edward Gordon, Galt, Ontario, and John Albert Read, North Bay, Ontario, Canada, assignors to Joy Manufacturing Company, Pittsburgh, Pa., a corporation of Pennsylvania Application June 10, 1955, Serial No. 514,621

14 Claims. (Cl. 214—658)

This invention relates to a machine for mucking while sinking a mine shaft and more particularly to an adjustable supporting and positioning structure for the digging implement of such a machine.

In shaft mucking machines presently in use for removing the muck which has been loosened by drilling and blasting at the bottom of a mine shaft, various forms of adjustable supporting and positioning means have been provided for the material removing or digging implement such as a shovel, grapple or scoop and, in a known instance, the mucking machine is trolley-mounted on tracks carried on the timber which frames the shaft so that the machine can be shifted in horizontal planes within the shaft to position the shovel or scoop so that it can reach into the corners of the shaft. In other cases, the mucking machine is operated from a fixed position which requires the employment of drag lines connected to the scoop or shovel and to the side walls of the shaft by means of pulleys about which the drag lines pass for pulling the shovel or scoop along the bottom of the shaft during the loading operation. A further disadvantage of the known prior machines is that the operator cannot assume a position so that he can readily control the positioning and movement of the grapple, shovel or scoop of the machine and, since men are working in the bottom of the shaft, it is important that the operator have a clear view of the bottom of the shaft and of the position of the grapple, shovel or scoop at all times.

An object of the present invention is to provide a mucking machine in which the operator is at all times directly above the muck removing or digging implement, such as a grapple, and the grapple can be moved to any part of the shaft bottom for the purpose of removing the loosened muck. A further object of the invention is to provide a mucking machine which is constructed so that the grapple or scoop can be swung into position to remove muck from the floor of the shaft without shifting the position of the control cage.

These and other objects of the present invention are accomplished by supporting, guiding and directing the material removing or digging implement by a swingable boom from which the digging implement may be suspended and which is swingably supported from the framing or cribbing of the mine shaft, the boom being provided with means so that it can be swung in any direction to move the grapple directly above the loose muck which is to be picked up by the grapple and deposit the muck in a suitable container for hoisting to ground level. Also, the control cage may be supported on the lower end of the boom so that it can be swung in any direction to move the control cage into the desired position whereby the machine operator may have a clear view of the position of the digging implement at all times. Other objects and advantages of the invention will, however, hereinafter more fully appear.

In the accompanying drawings there are shown for purposes of illustration two forms which the invention may assume in practice.

In these drawings:

Fig. 1 illustrates the preferred construction of the invention.

Fig. 2 shows a modified construction.

Referring first to Fig. 1, the mucking machine is shown as installed in a mine shaft 10 which is framed by framing or cribbing members 11.

The mucking machine comprises a swingable boom 12, a pair of extensible power adjusting or hydraulically operated cylinder and piston devices 13 and 14, a control cage 15, and a power operated material removing implement or grapple 16. The upper ends of the swingable boom 12 and the adjusting devices are connected to and supported by a plate 17 which is desirably L-shaped, the plate being securely attached to the cross framing of the cribbing 11. The extensible adjusting devices 13 and 14 comprise reciprocable hydraulic pistons contained in hydraulic cylinders. The upper end of the boom 12 is connected to the plate member 17 at the junction point of the two sides of the L by means of a conventional universal pivotal mounting 18. The upper ends of the cylinders containing the pistons are attached at each end of the L by means of the universal pivotal mountings 19 and 20, the other ends of the adjusting devices being pivotally connected to the boom, as indicated at 21 and 22 respectively. Hydraulic conduits 23, 24, 25 and 26 are connected to the cylinders of the extensible adjusting devices 13 and 14 and to a control cylinder 27 for supplying pressure fluid selectively to the cylinders for swinging the boom on its pivotal mounting 18.

The control cage 15 which provides the station for the operator is suspended from the lower end of the boom 12 by a conventional universal pivot 28 so that the cage is maintained substantially horizontal irrespective of the angular position of the boom on its pivotal mounting. The material removing implement or grapple 16 is also supported from the lower end of the boom by means of a cable 29 which has one end connected to a bracket 30, and the other end is connected to a conventional power operated winch 31 carried on the floor of the control cage. A conduit 32 supplies pressure fluid, desirably hydraulic pressure, from the control cylinder to a hydraulic cylinder and piston device 33 which opens and closes the grapple to load and unload in a well-known manner.

The modified construction illustrated in Fig. 2 differs from the preferred embodiment above described only in that the control cage 15' is supported on the cross members of the cribbing or frame immediately above the upper end of the boom instead of being suspended from the lower end of the boom as in the embodiment above described.

The operation of the mucking machine will be clearly apparent from the description given. The operator takes his position in the control cage and by selectively directing pressure fluid to the cylinders of the extensible adjusting devices 13 and 14, swings the boom 12 to bring the grapple 16 into digging position over the loosened muck to be removed from the shaft floor. It will be seen that with this construction the grapple can be placed to remove the loose muck even from the corners of the mine shaft. When the grapple is in its position over the loosened muck on the mine floor that is to be picked up by the grapple, the operator may then effect lowering of the grapple which has been opened along a vertical line, and then when it is in position, close the grapple, raise it vertically by the hoist, and then, by operating the devices 13 and 14, bring the grapple 16 into position so that the loose muck being loaded may be dumped into a usual bucket 34.

In the preceding description and the drawings, the mucking machine is described and shown as being suspended from the framework of the existing cribbing.

Alternatively, the mucking machine may be suspended in a conventional manner from the under flooring of the main hoist cage whereby the mucking machine may be raised out of the way when blasting is necessary at the bottom of the mine shaft.

As a result of this invention, the usual tracks, trucks or trolleys, motors and supporting framework normally required to obtain universal movement over an area are eliminated, while at the same time the advantages of the hoist-operated excavating devices having almost unrestricted hoisting height, lightness, flexibility and ease of convertibility from one excavating position to another are retained. A further advantage is the greatly increased operator's visibility. Other advantages will be clearly apparent to those skilled in the art.

The present invention is based on our pending Canadian application Serial No. 668,417, dated June 19, 1954.

While there are in this application specifically described two forms which the invention may assume in practice, it will be understood that these forms of the same are shown for purposes of illustration and that the invention may be further modified and embodied in various other forms without departing from its spirit or the scope of the appended claims.

What we claim as new and desire to secure by Letters Patent is:

1. A mucking machine comprising a supporting structure positionable in a mine shaft, a boom suspended from said supporting structure on a universal pivotal mounting located substantially centrally within the shaft, said boom extending downwardly within the shaft within the supporting structure, power devices operatively connected to said boom and to said supporting structure for swinging said boom to move its lower end laterally within the shaft, a material removing implement suspended from the lower end of said boom, means for operating said implement to effect movement thereof along a straight vertical path, and control means for operating said power devices to swing said boom to move said implement laterally substantially to any operating point between the walls of the mine shaft while said straight path of movement thereof remains vertical.

2. A mucking machine as set forth in claim 1 wherein means is provided for suspending said material removing implement from the lower end of said boom whereby said implement always remains in an upright operating position irrespective of the angular position of said boom on its pivotal mounting.

3. A mucking machine comprising a supporting structure positionable in a mine shaft, an adjustable mounting depending from said supporting structure, said adjustable mounting extending downwardly within the shaft beneath said supporting structure, a material removing implement suspended from said adjustable mounting, a control cage providing a station for the operator and supported at the lower end of said adjustable mounting, said material removing implement having its movements controlled from said cage, said mounting being adjustable to position said implement and control cage laterally in any desired position between the walls of the mine shaft, and means for suspending said material removing implement from the lower end of said adjustable mounting beneath said control cage and including means for moving said implement axially along a vertical line relative to said adjustable mounting irrespective of the adjusted position of the latter.

4. A mucking machine comprising a supporting structure positionable in a mine shaft, a boom adjustably mounted on and suspended from said supporting structure, a material removing implement suspended from the lower end of said boom, means associated with said boom for operating said material removing implement, means for adjusting said boom to locate said implement in different lateral positions between the walls of the mine shaft, and a control cage carried at the lower end of said boom and from which said implement operating means and said boom adjusting means may be controlled.

5. A mucking machine comprising a supporting structure positionable substantially centrally in a mine shaft, a boom adjustably mounted on and suspended from said supporting structure, said boom extending downwardly within the shaft from said supporting structure, a material removing implement suspended from the lower end of said boom, means associated with said boom for operating said material removing implement including means for moving said implement axially along a straight vertical line relative to said boom, and means for adjusting said boom to move its lower end laterally within the shaft thereby to locate said implement in different lateral positions between the walls of the mine shaft while said straight line of movement of said implement remains vertical.

6. A mucking machine comprising a boom suspended vertically on a universal pivotal mounting located substantially centrally within the shaft, said boom extending downwardly within the shaft from its pivotal mounting, a pair of extensible power devices operatively connected to said boom and to a fixed support on which said boom is pivotally mounted, a material removing implement suspended from the lower end of said boom including a cable for raising and lowering said implement along a straight vertical path, and control means for operating said extensible power devices to swing said boom to move the lower end thereof laterally within the shaft thereby to move said implement over the material to be removed thereby while said vertical path of movement of said implement is maintained.

7. A mucking machine comprising a supporting structure positionable in a mine shaft, a boom adjustably mounted on and suspended from said supporting structure, a material removing implement suspended from the lower end of said boom, means associated with said boom for operating said material removing implement including means for moving said implement axially along a straight vertical line relative to said boom, means for adjusting said boom to locate said implement in different lateral positions between the walls of the mine shaft, and a control cage carried by said supporting structure and from which said implement operating means and said boom adjusting means may be controlled.

8. A mucking machine comprising a boom suspended vertically on a universal pivotal mounting, a pair of extensible power devices operatively connected to said boom and to a fixed support on which said boom is pivotally mounted, a second universal pivotal mounting at the lower end of said boom, a material removing implement suspended from said second universal pivotal mounting including a cable for raising and lowering said implement, and control means for operating said extensible power devices to swing said boom to move said implement over the material to be removed thereby.

9. A mucking machine as set forth in claim 8 wherein a control cage is supported by an element of said second universal pivotal mounting and from which said material removing implement may be controlled, said control cage remaining in a substantially horizontal position irrespective of the angular position of said boom.

10. A mucking machine comprising a supporting structure positionable in a mine shaft, an adjustable mounting carried by said supporting structure, a material removing implement carried by said adjustable mounting at the outer portion thereof, and a control cage supported at the outer portion of said adjustable mounting, said material removing implement having its movements controlled from said cage, said mounting being adjustable to position said implement and said control cage laterally in any desired position between the walls of the mine shaft, and means for adjusting said mounting relative to said supporting structure.

11. A mucking machine comprising a supporting structure positionable in a mine shaft, a boom pivotally mounted on said supporting structure and having a universal pivotal mounting on said supporting structure, power devices operatively connected to said boom and to said supporting structure for swinging said boom on its pivotal mounting, a material removing implement carried at the outer end of said boom, means for operating said implement to effect its material removing function, a control cage carried at the outer end of said boom, and control means within said control cage for controlling the operation of said power devices to swing said boom to move said implement laterally into different operating positions within the mine shaft and control means within said control cage for controlling the operation of said material removing implement.

12. A mucking machine as set forth in claim 11 wherein the universal pivotal mounting is carried at the outer end of said boom and by which said material removing implement and said control cage are supported.

13. In combination, a supporting structure positionable in a mine shaft, a boom pivotally mounted at its upper end on said supporting structure and extending downwardly within the shaft, a material removing element suspended from the lower end of said boom, motor operated means for swinging said boom on its pivotal mounting to move said material removing element laterally within the shaft, motor operated means carried by said boom for raising and lowering said material removing element relative to said boom, a control cage carried at the lower end of said boom and providing a station for the operator, and control means located in said control cage for controlling the operation of said motor operated means.

14. A combination as set forth in claim 13 wherein said motor operated means for raising and lowering said material removing element relative to said boom is supported within said control cage.

References Cited in the file of this patent

UNITED STATES PATENTS

| | | |
|---|---|---|
| 981,268 | Hurd | Jan. 10, 1911 |
| 2,491,583 | Riddell | Dec. 20, 1949 |
| 2,606,679 | Cryderman | Aug. 12, 1952 |
| 2,710,700 | Anderson | June 14, 1955 |

FOREIGN PATENTS

| | | |
|---|---|---|
| 832,479 | Germany | Feb. 25, 1952 |
| 1,056,651 | France | Oct. 21, 1953 |